(12) United States Patent
Glogovsky et al.

(10) Patent No.: US 6,743,864 B2
(45) Date of Patent: Jun. 1, 2004

(54) POLYOLEFIN COMPOSITIONS HAVING HIGH TENACITY

(75) Inventors: Todd Glogovsky, Okemos, MI (US); Robert G. Butala, Hockessin, DE (US); Choong Y. Han, Wilmington, DE (US); Gerald John Ennis, Oxford, PA (US); Paolo Goberti, Vigarano Mainarda (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 10/379,177

(22) Filed: Mar. 4, 2003

(65) Prior Publication Data

US 2003/0181597 A1 Sep. 25, 2003

Related U.S. Application Data

(60) Provisional application No. 60/363,953, filed on Mar. 12, 2002.

(51) Int. Cl.$^7$ .......................... C08L 23/04; C08L 23/10; C08L 23/16
(52) U.S. Cl. ...................... 525/191; 525/216; 525/232; 525/240
(58) Field of Search ................................ 525/191, 216, 525/232, 240

(56) References Cited

U.S. PATENT DOCUMENTS

| | | | |
|---|---|---|---|
| 4,399,054 A | 8/1983 | Ferraris et al. | |
| 4,472,524 A | 9/1984 | Albizzati | 502/113 |
| 5,145,819 A | 9/1992 | Winter et al. | 502/117 |
| 5,256,228 A | 10/1993 | Davis et al. | 156/157 |
| 5,286,564 A | 2/1994 | Cecchin et al. | 428/402 |
| 5,324,800 A | 6/1994 | Welborn, Jr. et al. | 526/160 |
| 5,360,868 A | 11/1994 | Mosier et al. | 525/89 |
| 5,468,809 A | * 11/1995 | Ghisellini et al. | 525/240 |
| 5,541,260 A | * 7/1996 | Pelliconi et al. | 525/240 |
| RE37,384 E | 9/2001 | Winter et al. | 502/117 |
| 6,372,344 B1 | * 4/2002 | Castellani et al. | 428/379 |

FOREIGN PATENT DOCUMENTS

| | | |
|---|---|---|
| EP | 45977 | 2/1982 |
| EP | 129368 | 12/1984 |
| EP | 361493 | 4/1990 |
| EP | 416815 | 3/1991 |
| EP | 420436 | 4/1991 |
| EP | 485823 | 5/1992 |
| EP | 412534 | 11/1994 |
| EP | 643066 | 3/1995 |
| EP | 671404 | 9/1995 |
| EP | 728769 | 8/1996 |
| EP | 1202876.7 | 2/2003 |
| WO | 9104257 | 4/1991 |
| WO | 0011057 | 3/2000 |
| WO | 03011962 | 2/2003 |

* cited by examiner

Primary Examiner—Nathan M. Nutter

(57) ABSTRACT

A polyolefin composition suitable for preparing single ply roofing membranes, comprising:

(A) from about 15 to about 40% by weight of a crystalline copolymer of propylene with at least one alpha-olefin of formula $H_2C=CHR^1$, where $R^1$ is H or a $C_{2-8}$ linear or branched alkyl, containing at least about 90% by weight of propylene, having solubility in xylene at room temperature lower than about 15% by weight;

(B) from about 60 to about 85% by weight of an elastomeric fraction comprising:

(1) a copolymer of propylene with ethylene containing about 20 to about 35% by weight ethylene, and having solubility in xylene at room temperature greater than about 70% by weight, the intrinsic viscosity of the xylene soluble fraction being higher than about 3.0 dl/g up to about 6.0 dl/g; and (2) a copolymer of ethylene with at least one alpha-olefin of formula $H_2C=CHR^2$, where $R^2$ is a $C_{2-8}$ linear or branched alkyl, containing about 15% to 40% by weight alpha-olefin, and having solubility in xylene at room temperature greater than about 25% by weight, the intrinsic viscosity of the xylene soluble fraction ranging from about 0.5 to about 5.0 dl/g;

the (1)/(2) weight ratio ranging from about 1:5 to about 5:1.

The polyolefin composition of the invention, preferably prepared by sequential polymerization in at least three stages, has tensile strength at break ≧25 MPa, elongation at break ≧700 MPa and toughness ≧150 MPa.

14 Claims, No Drawings

POLYOLEFIN COMPOSITIONS HAVING HIGH TENACITY

CROSS-REFERENCE TO RELATED APPLICATION

This application claims priority to U.S. Provisional Application No. 60/363,953, filed Mar. 12, 2002. The entire contents of Application No. 60/363,953, as filed, is incorporated herein by reference.

FIELD OF THE INVENTION

The present invention concerns polyolefin compositions having improved tenacity, while retaining softness and good mechanical properties, which can be advantageously used in flat sheet material, such as single ply roofing membranes for covering industrial and commercial flat roofs, and in other roofing applications. These compositions may be obtained by a sequential polymerization process.

BACKGROUND OF THE INVENTION

Traditionally, the building industry has utilized conventional built-up asphalt or fiber glass roofing as a preferred material in roofing construction. More recently, however, membrane roofing materials have displaced the conventional materials as a preferred material due to their cold cracking resistance, ease of installation, and overall improved and increased leak protection over time. Further, the membrane systems are easier and safer to install and are therefore more desirable to the contractor as well as the consumer.

Two membrane types are utilized in this field: thermoplastic and elastomeric.

Thermoplastic membranes, such as those formed from polyvinyl chloride (PVC), chlorinated polyethylene (CPE), chlorosulfonated polyethylene and the like, can be heat sealed or solvent welded to provide dependable seals of higher strength; however, these membranes also have serious disadvantages. For example, the thermoplastic material must be plasticized to provide the flexibility necessary for a roofing membrane, and plasticizers are quite expensive and leach out of the membrane over time thus resulting in the loss of flexibility, embrittlement and decreased cold crack resistance of the membrane. Further, the capacity of the thermoplastic materials to accept fillers is limited.

Moreover, there is a need for a PVC sheeting alternative, in view of the trend toward a chlorine-free environment.

Elastomeric membranes, such as vulcanized ethylene/propylene/diene terpolymers EPDM rubbers, has been rapidly gaining acceptance, because of outstanding weathering resistance and flexibility. This material normally is prepared by vulcanizing the composition in the presence of sulfur or sulfur containing compounds.

However, these membranes are difficult to seal, due to the lack of adhesion of EPDM, especially cured EPDM, to itself, and require an adhesive for seaming the membrane in order to provide a leak-free, continuous roofing cover. These adhesives add a significant material cost and are difficult and time-consuming to apply. Further, the adhesives often weaken over time, causing delamination of the membranes and subsequent leaks in the roofing cover. Elastomeric membranes also require an additional costly curing step.

In order to avoid the curing procedure, in the state of the art it was proposed to use sheeting materials for roofing applications comprising an EPDM in combination with highly crystalline thermoplasticity promoters, such as high density polyethylene (HDPE), low density polyethylene (LDPE) and other similar olefin type polymers. For instance, U.S. Pat. No. 5,256,228 discloses a heat seamable sheet material for roofing, prepared from an uncured polymeric composition which comprises 100 parts by weight of a polymer blend comprising from 50 to 90 parts by weight of polyolefins having up to 2 percent by weight crystallinity, and from 10 to 50 parts by weight of a highly crystalline thermoplasticity promoter such as HDPE or LDPE; 50–250 parts by weight of a filler; and 20–150 parts by weight of a processing material.

Nevertheless, the presence of crystalline polyethylene resins have many disadvantages. For instance, higher crystallinity levels result in less thermal dimensional stability, expansion or contraction over large temperature ranging observed in the field; this may result in bucking or stress on the sheet. Moreover, the lower melting characteristics of polyethylene result in limitations for applications at elevated temperatures, such as in dark colored sheet. Finally, polyethylene has a narrow melting point range, which results in a narrow heat welding process window.

Polyolefin compositions having good mechanical properties have been used in many application fields, due to the characteristics which are typical of polyolefins (such as chemical inertia, mechanical properties and nontoxicity); moreover, these compositions show outstanding cost/performance ratios. In the state of the art, these compositions have been obtained by way of sequential copolymerization of propylene, optionally containing minor quantities of olefin comonomers, and then ethylene/propylene or ethylene/alpha-olefin mixtures. Catalysts based on halogenated titanium compounds supported on magnesium chloride are commonly used for this purpose.

For instance, U.S. Pat. No. 5,286,564, in the name of the same Applicants, describes flexible polyolefin compositions comprising, in parts by weight:
A) 10–50 parts of an isotactic propylene homopolymer or copolymer;
B) 5–20 parts of an ethylene copolymer, insoluble in xylene at room temperature; and
C) 40–80 parts of an ethylene/propylene copolymer containing less than 40% by weight of ethylene and being soluble in xylene at room temperature; the intrinsic viscosity of said copolymer is preferably from 1.7 to 3 dl/g.

Said compositions have flexural modulus values of less than 150 MPa and Shore D hardness between 20 and 35. Although these mechanical properties are advantageous for certain applications, the compositions prepared in Examples 1–5 show values of Tensile Strength at Break ranging from 13.8 to 17.3 MPa; for many applications, such as in roofing sheets, these polymers do not show a satisfactory tenacity, which is a property strictly related to tensile strength at break and to elongation at break properties. Tenacity is fundamental in roofing applications, wherein there is the tendency of roofing to break under the action of the wind.

As it is well known in the art, the strength and flexibility of thermoplastic polyolefin compositions may be enhanced decreasing the rubber content; nevertheless, to the increase in strength is usually associated an increase in stiffness that causes various drawbacks. For instance, the increase in stiffness of a flexible membrane limits the installation of the membrane around corner, chimneys, vents etc., where the membrane must be flexible to bend around the obstruction.

The European Patent Application No. 1202876.7, in the name of the same Applicants, describes a polyolefin composition comprising:

(A) from 8 to 25% by weight of a crystalline propylene homopolymer or copolymer; and (B) from 75 to 92% by weight of an elastomeric fraction comprising a first elastomeric copolymer of propylene with 15–32% wt ethylene, the intrinsic viscosity of the xylene soluble fraction ranging from 3.0 to 5.0 dl/g; and a second elastomeric copolymer of propylene with more than 32% up to 45% wt. of ethylene, the intrinsic viscosity of the xylene soluble fraction ranging from 4.0 to 6.5 dl/g.

These polyolefin compositions have flexural modulus values lower than 60 MPa and very good hardness values (Shore A hardness lower than 90); nevertheless, they exhibit low tenacity values. In fact, the polyolefin compositions prepared in Examples 1–3 of the above-mentioned application show values of Tensile Strength at Break equal to 5.5, 11.7 and 11.2 MPa respectively. As reported above, such values are not fully satisfactory for roof sheeting, since the increase in flexibility is associated to an enhanced stiffniess.

A strong need therefore exists for softer materials which are easier to install, and at the same time possess a satisfactory tenacity, strength, and tear and puncture resistance. In other words, it is felt the need for polyolefin compositions which exhibit a good balance of flexibility over a variable temperature range, and tenacity, as well as good mechanical properties; moreover, these compositions must be heat-sealable and oil-resistant and must not undergo degradation when exposed to the elements.

SUMMARY OF THE INVENTION

The present invention concerns a polyolefin composition comprising:

(A) from about 15 to about 40% by weight of a crystalline copolymer of propylene with at least one alpha-olefin of formula $H_2C=CHR^1$, where $R^1$ is H or a $C_{2-8}$ linear or branched alkyl, containing at least about 90% by weight of propylene, and having solubility in xylene at room temperature lower than about 15% by weight;

(B) from about 60 to about 85% by weight of an elastomeric fraction comprising:

(1) a copolymer of propylene with ethylene, optionally containing about 0.5 to 5% by weight of a diene, containing from about 20 to about 35% by weight ethylene, and having solubility in xylene at room temperature greater than about 70% by weight, the intrinsic viscosity of the xylene soluble fraction being higher than about 3.0 dl/g up to about 6.0 dl/g; and (2) a copolymer of ethylene with at least one alpha-olefin of formula $H_2C=CHR^2$, where $R^2$ is a $C_{2-8}$ linear or branched alkyl, optionally containing about 0.5 to 5% by weight of a diene, containing about 15% to 40% by weight alpha-olefin, and having solubility in xylene at room temperature greater than about 25% by weight, the intrinsic viscosity of the xylene soluble fraction ranging from about 0.5 to about 5.0 dl/g;

the (1)/(2) weight ratio ranging from about 1:5 to about 5:1.

The present invention further concerns a process for the preparation of the polyolefin composition reported above, comprising at least three sequential polymerization stages, with each subsequent polymerization being conducted in the presence of the polymeric material formed in the immediately preceding polymerization reaction, wherein the crystalline copolymer (A) is prepared in a first stage, and the elastomeric fraction (B) is prepared in at least two subsequent stages. According to a preferred embodiment, all the polymerization stages are carried out in the presence of a catalyst comprising a trialkylaluminum compound, optionally an electron donor, and a solid catalyst component comprising a halide, or halogen-alcoholate of Ti, and an electron donor compound supported on anhydrous magnesium chloride, said solid catalyst component having a surface area (measured by BET) of less than about 200 m$^2$/g, and a porosity (measured by BET) higher than about 0.2 ml/g.

DETAILED DESCRIPTION OF THE INVENTION

The polyolefin compositions of the present invention show a significant improvement in strength and toughness, without sacrificing stiffness; on the opposite, applicants have surprisingly found that the stiffness of the compositions of the invention is reduced with respect to prior art compositions containing lower amounts of rubber content. More specifically, the compositions of the invention are endowed with high tenacity, as evidenced by the values of tensile strength at break and elongation at break much higher than the ones of the prior art thermoplastic resins used in flexible roofing membranes, at the same time showing a remarkable reduction in stiffness.

The compositions of the invention exhibit a very good balance of flexibility and mechanical properties, and in particular of flexural modulus values and Shore D hardness, at the same time retaining good elastomeric properties. These soft compositions, easier to install even around corners and chimneys, show better strength and tear resistance, as well as improved wind uplift and puncture resistance; moreover, they are endowed with long term weldability.

The polyolefin compositions of the present invention comprise from about 15 to about 40% by weight, preferably from about 15 to about 35%, and even more preferably from about 20 to about 30%, of a crystalline copolymer of propylene (A), and from about 60 to about 85% by weight, preferably from about 65 to about 85%, and even more preferably from about 70 to about 80% by weight of an elastomeric fraction (B).

In the present description, by "room temperature" is meant approximately 25° C.

The crystalline copolymer (A) of the compositions of the invention is a copolymer of propylene with an alpha-olefin $H_2C=CHR^1$, where $R^1$ is H or a $C_{2-8}$ linear or branched alkyl, containing at least about 90% by weight of propylene, preferably at least about 95% propylene. This copolymer has solubility in xylene at room temperature lower than about 15% by weight, preferably lower than about 10%, and even more preferably lower than about 8%. Said alpha-olefin is preferably ethylene, 1-butene, 1-pentene, 4-methylpentene, 1-hexene, 1-octene or combinations thereof, and even more preferably it is ethylene.

The elastomeric fraction (B) of the polyolefin compositions of the invention comprises a copolymer of propylene with ethylene, and a copolymer of ethylene with an alpha-olefin $H_2C=CHR^2$, where $R^2$ is a linear or branched $C_{2-8}$ alkyl. By "elastomenrc" is meant herein a polymer having low cristallinity or amorphous, and having a solubility in xylene at room temperature greater than about 40% by weight.

The copolymer (1) of propylene with ethylene contains from about 20 to about 35% by weight of ethylene, preferably from about 25 to about 30%, and has a solubility in xylene at room temperature greater than about 70% by weight, preferably greater than about 75%; the intrinsic viscosity of the xylene soluble fraction ranges from about 3.0 to about 6.0 dl/g, more preferably from about 3.5 to about 5.0 dl/g, and even more preferably from about 4.0 to about 4.5 dl/g.

The copolymer (2) is a copolymer of ethylene with at least one alpha olefin of formula $H_2C=CHR^2$, where $R^2$ is a $C_{2-8}$ linear or branched alkyl, optionally containing about 0.5 to 5% by weight of a diene; said alpha-olefin is preferably 1-butene, 1-hexene or 1-octene, and even more preferably is 1-butene. The alpha-olefin content ranges from about 15% to about 40% by weight, and preferably from about 20 to about 35%. The copolymer (2) has solubility in xylene at room temperature greater than about 25% by weight, preferably greater than about 30%, and the intrinsic viscosity of the xylene soluble fraction ranges from about 0.5 to about 5.0 dl/g, preferably from about 1.0 to about 4.5 dl/g.

As previously reported, the copolymers (1) and (2) of the elastomeric fraction (B) may contain a diene, conjugated or not, such as butadiene, 1,4-hexadiene, 1,5-hexadiene and ethylidene-norbornene-1. The diene, when present, is contained in an amount of from about 0.5 to about 5% by weight, with respect to the weight of the fraction (B).

The weight ratio of the elastomeric copolymers (1)/(2) ranges from about 1:5 to about 5:1, and preferably from about 1:2 to about 2:1.

The polyolefin composition of the invention, preferably prepared by sequential polymerization in at least three stages, shows high tenacity, and in particular has tensile strength at break 25 MPa (ASTM D 882, on a 100 μm film), more preferably ≧28 MPa; elongation at break 700 MPa (ASTM D 882, on a 100 μm film), more preferably ≧750 MPa; and toughness 150 MPa (ASTM D 638, on a 1 mm sheet), more preferably 170 MPa.

Moreover, said composition has a flexural modulus 130 MPa, preferably 100 MPa, and more preferably 80 MPa; Shore D hardness 40° S, and preferably ranging from about 25 to about 35; and MFR <1.0 g/10 min, preferably <0.8 g/10 min, and even more preferably <0.6 g/10 min.

According to a preferred embodiment of the invention, the polyolefin composition is in the form of spherical particles having an average diameter of about 250 to about 7,000 microns, a flowability of less than about 30 seconds and a bulk density (compacted) greater than about 0.4 g/ml.

The polyolefin composition of the invention may be prepared by sequential polymerization in at least three stages; according to a preferred embodiment, the sequential polymerization is carried out in the presence of a catalyst comprising a trialkylaluminum compound, optionally an electron donor, and a solid catalyst component comprising a halide or halogen-alcoholate of Ti, and an electron-donor compound supported on anhydrous magnesium chloride.

The present invention is further directed to a process for the preparation of the polyolefin compositions as reported above, said process comprising at least three sequential polymerization stages with each subsequent polymerization being conducted in the presence of the polymeric material formed in the immediately preceding polymerization reaction, wherein the crystalline copolymer (A) is prepared in at least one first stage, and the elastomeric fraction (B) is prepared in at least two sequential stages. The polymerization stages may be carried out in the presence of a Ziegler-Natta and/or a metallocene catalyst.

Suitable Ziegler-Natta catalysts are described in EP-A-45 977 and U.S. Pat. No. 4,399,054, incorporated herein by reference; other examples can be found in U.S. Pat. No. 4,472,524, incorporated herein by reference.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids.

Particularly suitable electron-donor compounds are phthalic acid esters, such as diusobutyl, dioctyl, diphenyl and benzylbutyl phthalate.

Other suitable electron-donors are 1,3-diethers of formula:

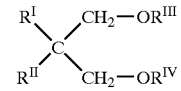

wherein $R^I$ and $R^{II}$, the same or different from each other, are $C_1$–$C_{18}$ alkyl, $C_3$–$C_{18}$ cycloalkyl or $C_7$–$C_{18}$ aryl radicals; $R^{III}$ and $R^{IV}$, the same or different from each other, are $C_1$–$C_4$ alkyl radicals; or are the 1,3-diethers in which the carbon atom in position 2 belongs to a cyclic or polycyclic structure made up of 5, 6 or 7 carbon atoms and containing two or three unsaturations.

Ethers of this type are described in EP-A-361 493 and EP-A-728 769.

Representative examples of said dieters are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, and 9,9-bis(methoxymethyl)fluorene.

The preparation of the above mentioned catalyst components is carried out according to various methods.

According to a preferred method of preparation, a $MgCl_2 \cdot nROH$ adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from about 0.5 to about 10% by weight. The quantity of electron-donor compound which remains fixed on the solid catalyst component generally is about 5 to 20% by moles with respect to the magnesium dihalide.

The titanium compounds which can be used in the preparation of the solid catalyst component are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise Al-trialkyls, such as Al-triethyl, Al-triisobutyl, Al-tri-n-butyl, and linear or cyclic Al-alkyl compounds containing two or more Al atoms bonded to each other by way of O or N atoms, $SO_4$ or $SO_3$ groups. The Al-alkyl compound is generally used in such a quantity that the Al/Ti ratio be from about 1 to about 1000.

The electron-donor compounds that can be used as external donors include aromatic acid esters such as alkyl benzoates, and in particular silicon compounds containing at least one Si—OR bond, where R is a hydrocarbon radical. Examples of silicon compounds are $(tert\text{-}butyl)_2Si(OCH_3)_2$, $(cyclohexyl)(methyl)Si(OCH_3)_2$, $(phenyl)_2Si(OCH_3)_2$ and $(cyclopentyl)_2Si(OCH_3)_2$. 1,3-diethers having the formulae described above can also be used advantageously. If the internal donor is one of these dieters, the external donors can be omitted.

The solid catalyst component have preferably a surface area (measured by BET) of less than about 200 m²/g, and more preferably ranging from about 80 to about 170 m²/g, and a porosity (measured by BET) preferably greater than about 0.2 ml/g, and more preferably from about 0.25 to about 0.5 ml/g.

The catalysts may be precontacted with small quantities of olefin (prepolymerization), maintaining the catalyst in suspension in a hydrocarbon solvent, and polymerizing at temperatures from ambient to 60° C., thus producing a quantity of polymer from about 0.5 to about 3 times the weight of the catalyst. The operation can also take place in liquid monomer, producing, in this case, a quantity of polymer 1000 times the weight of the catalyst.

By using the above-mentioned catalysts, the polyolefin compositions are obtained in spheroidal particle form, the particles having an average diameter from about 250 to about 7,000 microns, a flowability of less than about 30 seconds and a bulk density (compacted) greater than about 0.4 g/ml.

Other catalysts that may be used in the process according to the present invention are metallocene-type catalysts, as described in EP-A-0 129 368 and U.S. Pat. No. 5,324,800, incorporated herein by reference; particularly advantageous are bridged bis-indenyl metallocenes, for instance as described in EP-A-0 485 823 and U.S. Pat. No. 5,145,819, incorporated herein by reference. Another class of suitable catalysts are the so-called constrained geometry catalysts, as described in EP-A-0 416 815, EP-A-0 420 436, EP-A-0 671 404, EP-A-0 643 066 and WO 91/04257. These metallocene compounds may be used to produce the copolymers (1) and (2) of the elastomeric fraction (B).

According to a preferred embodiment, the polymerization process of the invention comprises three stages, all carried out in the presence of Ziegler-Natta catalysts, where: in the first stage the relevant monomer(s) are polymerized to form the crystalline copolymer (A); in the second stage a mixture of propylene and ethylene, and optionally a diene are polymerized to form the copolymer (B)(1); and in the third stage a mixture of ethylene and an alpha-olefin $H_2C=CHR^2$, and optionally a diene, are polymerized to form the copolymer (B)(2).

The polymerization stages may occur in liquid phase, in gas phase or liquid-gas phase. Preferably, the polymerization of the crystalline copolymer fraction (A) is carried out in liquid monomer (e.g. using liquid propylene as diluent), while the copolymerization stages of the copolymers (B)(1) and (B)(2) are carried out in gas phase, without intermediate stages except for the partial degassing of the propylene. According to a most preferred embodiment, all the three sequential polymerization stages are carried out in gas phase.

The reaction temperature in the polymerization stage for the preparation of the crystalline copolymer (A) and in the preparation of the copolymers (B)(1) and (B)(2) can be the same or different, and is preferably from about 40° C. to about 90° C.; more preferably, the reaction temperature ranges from about 50 to about 80° C. in the preparation of the fraction (A), and from about 40 to about 80° C. for the preparation of components (B)(1) and (B)(2).

The pressure of the polymerization stage to prepare the fraction (A), if carried out in liquid monomer, is the one which competes with the vapor pressure of the liquid propylene at the operating temperature used, and is possibly modified by the vapor pressure of the small quantity of inert diluent used to feed the catalyst mixture, and the overpressure of the monomers and the hydrogen optionally used as molecular weight regulator.

The polymerization pressure preferably ranges from about 33 to about 43 bar, if done in liquid phase, and from about 5 to about 30 bar if done in gas phase. The residence times of the three stages depend on the desired ratio between the fractions, and can range from about 15 minutes to 8 hours. Conventional molecular weight regulators known in the art, such as chain transfer agents (e.g. hydrogen or $ZnEt_2$), may be used.

The compositions of the invention may be used in combination with other elastomeric polymers, such as ethylene/propylene copolymers (EPR), ethylene/propylene/diene terpolymers (EPDM), copolymers of ethylene with $C_4$–$C_{12}$ alpha-olefins (e.g. ethylene/octene-1 copolymers, such as the ones commercialized under the name Engage®) and mixtures thereof. Such elastomeric polymers may be present in an amount of 5 to 80% by weight on the total composition.

In addition to its polymer components, the composition of the present invention can be blended with common additives, such as reinforcing and non-reinforcing fillers, pigments, nucleating agents, extension oils, mineral fillers, flame retardants (e.g. aluminum trihydrate), antioxidants, UV resistants (e.g. titanium dioxide), UV stabilizers, lubricants (e.g., oleamide), antiblocking agents, antistatic agents, waxes, coupling agents for fillers and other processing aids known in the polymer compounding art. The pigments and other additives may comprise up to about 50 weight percent of the total composition based on polymer components plus additives; preferably pigments and fillers comprise above about 0 to about 30 weight percent of the total composition.

In view of the properties described above, the polyolefin compositions of the present invention are valuable in the production of roofing membranes for covering industrial and commercial flat roofs, and in other roofing applications. In fact, they possess a high tenacity, while retaining softness and good mechanical properties.

Moreover, the roofing membranes obtained with the polyolefin compositions of the invention are weatherproof, inexpensive to manufacture, and durable, having an average life far greater than that of current commercial roofing shingles which are made using fiberglass or asphalt.

Roofing membranes formed from the polyolefin compositions of the present invention may be produced by any method conventionally used for producing roofing membranes from filled polymer compositions. For example, the membranes may be formed by conventional milling, calendering or extrusion techniques. Other methods, including spray coating and roller die forming, may be used. According to a preferred embodiment, the polymeric compositions of the invention are sheeted to thickness ranging from about 5 to about 200 mils. The sheeting can be cut to desired length and width dimensions at this time.

Roofing membranes formed from the compositions of the present invention may optionally be scrim reinforced. Besides roofing membranes, the polyolefin compositions of this invention may be used to produce underlay materials, used as replacements for roofing felt.

Roofing membranes can be applied in the same manner and circumstances as conventional asphaltic or fiberglass membranes. They have light weight, providing potential cost savings in the design of structural roof supports, as well as ease of application. They provide outstanding strength and durability, together with excellent temperature stability, weatherability and resiliency.

A method for covering a roof comprises the steps of applying sheets of the polymeric material of the invention to the roof being covered; overlapping adjacent edges of the layers; heating the overlapped areas to slightly above the softening point of the sheet material and seaming the overlapped areas using heat and under sufficient pressure to provide an acceptable seam strength. The polymeric compositions have sufficient self-adhesion without the use of an adhesive.

The following analytical methods have been used to determine the properties reported in the detailed description and in the examples.

| Property | Method |
|---|---|
| Melt Flow Rate (MFRL) | ASTM D 1238 condition L (230° C., 2.16 kg) |
| Ethylene % by weight | I.R. Spectroscopy |
| 1-Butene % by weight | I.R. Spectroscopy |
| Intrinsic Viscosity | In tetrahydronaphthalene, at 135° C. |
| Shore Hardness D | ASTM D 2240 |
| Flexural modulus at 23° C. | ASTM D730M (after 3 hours) |
| Tensile Modulus | ASTM D882 on 100 µm cast film, with a speed of 5 mm/min |
| 2% Secant Modulus | ASTM D638; on 1 mm extruded sheet, 25.4 mm × 152.4 mm (1" × 6") die cut, no extensometer; test speed of 25.4 mm/min (1"/min); test temperature of 23° C., −40° C. and 85° C. This test characterizes the material stiffness |
| Tensile strength at break and at yield | 1) ASTM D 882, after 3 hrs, on 100 µm cast film, test speed of 50 mm/min<br>2) ASTM D 638, test speed of 50 mm/min on 1 mm extruded sheet, at 23° C. Type IV die cut, no extensometer. For tests at −40° C., an environmental chamber and D1822 Type S specimens were used |
| Elongation at break and at yield | 1) ASTM D 882, after 3 hrs, on 100 µm cast film, test speed of 50 mm/min<br>2) ASTM D 638 on 1 mm extruded sheet. Type IV die cut, no extensometer. For tests at −40° C., an environmental chamber and D1822 Type S specimens were used. |
| Toughness | ASTM D 638, on 1 mm extruded sheet; test temperatures of 23° C. and −40° C. Toughness is defined as the area under the stress-strain curve. |
| Tear Resistance | ASTM D1004; test speed 50 mm/min; test temperatures of 23° C.; a V-shaped die cut specimen was used. |
| Longitudinal CLTE | ASTM E381-86; before the measurement, the sample is conditioned into the TMA (thermomechanical analysis) apparatus at 120° C. for 10 minutes in order to erase the stresses induced into the specimen (2.5 mm thick and 10 mm length) by injection molding. The dialatation is then measured in a temperature range from 0 to 45° C., at 3° C./min scanning rate under a flat probe (3.66 mm diameter) with a load of 1 mN. |
| Surface area | B.E.T. |
| Porosity | B.E.T. |
| Bulk density | DIN 53194 |

Determination of Xylene Solubility at Room Temperature (% by weight):

2.5 g of polymer were dissolved in 250 ml of xylene, at 135° C., under agitation. After 20 minutes, the solution was cooled to 25° C. under stirring, and then it was allowed to settle for 30 minutes.

The precipitate was filtered with filter paper; the solution was evaporated under a nitrogen current, and the residue dried under vacuum at 80° C. until reached constant weight. The weight percentage of polymer soluble in xylene at room temperature was then calculated. The percent by weight of polymer insoluble in xylene at room temperature was considered the isotactic index of the polymer. This value corresponded substantially to the isotactic index determined by extraction with boiling n-heptane, which by definition constitutes the isotactic index of polypropylene.

Unless otherwise specified, the samples to be subjected to the various physical-mechanical analyses were molded by use of a Negri & Bossi injection press 90, after stabilizing the sample with IRGANOX R 1010 hindered phenolic stabilizer (0.05% by weight), and IRGAFOS 168 phosphite stabilizer (0.1% by weight), and pelletizing the sample with a twin-screw Berstorff extruder (barrel diameter 25 mm) at 210° C.

The conditions were as follows:
temperature of the melt: 220° C.;
temperature of the mold: 60° C.;
injection time: 9 sec;
cooling time: 15 sec.

The dimensions of the plaques for the tests were 127× 127×2.5 mm. From these plaques, C-type dumbbells were cut and submitted to tensile strength tests with a head speed of 500 mm/min. Also the specimens for the flexural modulus and hardness Shore D were cut from these plaques. All the specimens were cut parallel to the advancement front and consequently perpendicular to the flow direction.

EXAMPLES 1 AND 2

Preparation of the Catalyst System

A catalyst component comprising $MgCl_2.3C_2H_5OH$ adduct was prepared as follows: 28.4 g of anhydrous $MgCl_2$, 49.5 g of pure anhydrous ethanol, 100 ml of ROL OB/30 vaseline oil, and 100 ml of silicone oil (350 cs viscosity) were introduced in a flask immersed in a bath thermoregulated, at 120° C. under agitation, in an inert atmosphere, until the $MgCl_2$ was completely dissolved. The mixture was then transferred hot, always under an inert atmosphere, in a 150 ml container equipped with a heating jacket, and containing 150 ml of vaseline oil and 150 ml of silicone oil. The mixture was maintained at 120° C. and under agitation, the latter being carried out with a Hanke & Kunkel K. G. Ika Werke Ultra Turrax T-45 N agitator. Said agitation continued for 3 minutes at 3000 rpm. The mixture was discharged into a 2 liter vessel containing 1000 ml of anhydrous n-heptane stirred and cooled so that the final temperature did not exceed 0° C. The $MgCl_2.3EtOH$ microspheres thus obtained were filtered and dried under vacuum at room temperature. The dried adduct obtained in this manner was then dealcoholated by heating at temperatures gradually increasing from 50° C. to 100° C., under nitrogen current, until the alcohol content was 1.1 moles per mole $MgCl_2$.

The partially dealcoholated adduct thus obtained had a surface area of 11.5 $m^2/g$, a porosity of 0.13 ml/g and bulk density of 0.564 g/ml.

25 g of the obtained adduct were added, under stirring at 0° C., to 625 ml of $TiCl_4$. The mixture was then heated to 100° C. in 1 hour. When the temperature reached 40° C., diisobutylphthalate was added in an amount such that the Mg/diisobutylphtahalate molar ratio was 8. The resulting mixture was heated at 100° C. for 2 more hours, then allowed to settle, and the liquid was siphoned off hot. 550 ml of $TiCl_4$ were added and the mixture was heated at 120° C. for 1 hour.

The obtained mixture was allowed to settle and the liquid was siphoned off hot. The solid was washed 6 times using 200 ml of anhydrous hexane at 60° C., and three more times using 200 ml of anhydrous hexane at room temperature.

After drying under vacuum, the solid presented porosity equal to 0.383 ml/g and surface area equal to 150 $m^2/g$.

General Polymerization Process

The polymerizations were done in stainless steel fluidized bed reactors.

During the polymerization, the gas phase in each reactor was continuously analyzed by gaschromatography in order to determine the content of ethylene, propylene and hydrogen. Ethylene, propylene, 1-butene and hydrogen were fed in such a way that during the course of the polymerization their concentration in gas phase remained constant, using instruments that measure and/or regulate the flow of the monomers.

The operation was continuous in three stages, each one comprising the polymerization of the monomers in gas phase.

Propylene was prepolymerized in liquid propane in a 80 liters stainless steel loop reactor with an internal temperature of 20° C., for a period of 30 minutes, with a propylene feed of 30 Kg/h, in the presence of a catalyst system comprising a solid component (26 g/h) prepared as described above, and a mixture of 75–80 g/h Al-triethyl (TEAL) in a 10% hexane solution and an appropriate quantity of dicyclopenthyldimethoxysilane (DCPMS) donor, so that the TEAL/DCPMS wt. ratio was 5. The catalyst was prepared according to the process reported above.

1st stage—The thus obtained prepolymer was discharged into the first gas phase reactor, having a temperature of 60° C. and a pressure of 14 barg. Thereafter, hydrogen, propylene, ethylene and an inert gas were fed in the ratio and quantities reported in Table 1, to obtain the composition of the gas phase reported in Table 1, and the polymerization was carried out for the time reported in Table 1.

2nd stage—After removing a sample to carry out the various analyses, the polymer obtained from the first stage was discharged into the second phase reactor having a temperature of 60° C. and a pressure of 18 barg. Thereafter, hydrogen, propylene, ethylene and an inert gas were fed in the ratio and quantities reported in Table 1, to obtain the composition of the gas phase reported in Table 1, and the polymerization was carried out for the time reported in Table 1.

3rd stage—After removing a sample to carry out the various analyses, the polymer obtained from the second stage was discharged into the third phase reactor, having a temperature of 75° C. and a pressure of 14 barg. Thereafter, hydrogen, ethylene, 1-butene and an inert gas were fed in the ratio and quantities reported in Table 1, to obtain the composition of the gas phase reported in Table 1, and the polymerization was carried out for the time reported in Table 1.

At the end of the polymerization, the particulate polymer was discharged, at atmospheric pressure, into a vessel where a countercurrent steam was fed in order to strip the remaining monomers. Thereafter, the polymer was discharged into a vessel, where countercurrent nitrogen was fed at 80–90° C. in order to dry the polymer.

The operating conditions used in the above process and the results of the analyses performed on the polymer compositions obtained therefrom are shown in Tables 1 and 2 respectively.

EXAMPLES 3–5

The polymerization procedure of Example 1 was repeated, with the exception that the following conditions were used in the polymerization stages:

in Stage 1, the polymerization was carried out at a temperature of 60° C. and under a pressure of 14 barg, for the time reported in Table 1;

in Stage 2, the polymerization was carried out at a temperature of 60° C. and under a pressure of 18 barg, for the time reported in Table 1; and in Stage 3, the polymerization was carried out at a temperature of 77° C. and under a pressure of 14 barg, for the time reported in Table 1.

The operating conditions used in the above process and the results of the analyses performed on the polymer compositions obtained therefrom are shown in Tables 1 and 2 respectively.

EXAMPLES 6 AND 7

The polymerization procedure of Example 1 was repeated, with the exception that the following conditions were used in the polymerization stages:

in Stage 1, the polymerization was carried out at a temperature of 60° C. and under a pressure of 14 barg, for the time reported in Table 1;

in Stage 2, the polymerization was carried out at a temperature of 60° C. and under a pressure of 18 barg, for the time reported in Table 1; and in Stage 3, the polymerization was carried out at a temperature of 80° C. and under a pressure of 14 barg, for the time reported in Table 1.

The operating conditions used in the above process and the results of the analyses performed on the polymer compositions obtained therefrom are shown in Tables 1 and 2 respectively.

TABLE 1

|  | Ex. 1 | Ex. 2 | Ex. 3 | Ex. 4 | Ex. 5 | Ex. 6 | Ex. 7 |
|---|---|---|---|---|---|---|---|
| 1st stage (gas phase) | | | | | | | |
| Split (% wt.) | 25 | 26 | 21 | 20 | 26 | 22 | 18 |
| Time (minutes) | 60 | 80 | 93 | 92 | 128 | 140 | 150 |
| $H_2$ in gas phase (% mol) | 1.10 | 1.23 | 0.09 | 0.08 | 0.09 | 0.02 | 0.02 |
| Ethylene in gas phase (% mol) | 0.3 | 0.2 | 0.2 | 0.2 | 0.2 | 0.2 | 0.2 |
| Propylene in gas phase (% mol) | 8.6 | 8.7 | 7.4 | 9.0 | 8.6 | 9.0 | 8.9 |
| Ethylene in (A) (% wt) | 3.4 | 3.0 | 3.4 | 3.5 | 3.4 | 3.2 | 3.1 |
| MFR "L" (g/10 min) | 38.4 | 47.7 | 7.4 | 5.7 | 6.3 | 2.8 | 2.9 |
| Sol. Xyl. (% wt) | 7.9 | 8.1 | 7.0 | 7.0 | 7.0 | 7.3 | 7.3 |
| 2nd stage (gas phase) | | | | | | | |
| Split (% wt) | 35 | 41 | 39 | 37 | 35 | 32 | 36 |
| Time (minutes) | 25 | 23 | 20 | 20 | 23 | 16 | 16 |
| $H_2$ in gas phase (% mol) | 0.32 | 0.34 | 0.32 | 0.29 | 0.31 | 0.31 | 0.30 |
| Ethylene in gas phase (% mol) | 11.0 | 11.7 | 10.3 | 10.7 | 10.7 | 11.2 | 11.6 |
| Propylene in gas phase (% mol) | 58.1 | 55.8 | 53.6 | 56.9 | 57.1 | 55.8 | 55.7 |
| Ethylene in (B) (1) (% wt) | 30 | 30 | 27 | 28 | 28 | 28 | 29 |
| Ethylene tot. (% wt) | 18.9 | 19.3 | 18.9 | 19.3 | 17.6 | 17.9 | 19.9 |
| MFR "L" tot. (g/10 min) | 0.34 | 0.42 | 0.22 | 0.19 | 0.28 | 0.24 | 0.20 |
| Sol. Xyl. in (B) (1) (% wt) | 91 | 90 | 91 | 91 | 91 | 91 | 90 |
| Sol. Xyl. tot. (% wt) | 55.7 | 57.9 | 61.6 | 62.0 | 55.0 | 56.0 | 62.1 |
| I.V. Sol. Xyl. (dl/g) | 4.1 | 4.3 | 4.1 | 4.5 | 4.1 | 4.1 | 4.2 |
| 3rd stage (gas phase) | | | | | | | |
| Split (% wt) | 40 | 33 | 40 | 43 | 39 | 46 | 46 |
| Time (minutes) | 110 | 100 | 77 | 90 | 115 | 130 | 125 |
| $H_2$ in gas phase (% mol) | 3.30 | 3.02 | 8.89 | 5.34 | 7.52 | 8.90 | 8.66 |
| Ethylene in gas phase (% mol) | 38.6 | 36.2 | 42.7 | 41.9 | 43.2 | 43.9 | 43.2 |
| 1-Butene in gas phase (% mol) | 26.1 | 24.8 | 27.4 | 27.6 | 27.7 | 27.6 | 26.1 |
| 1-Butene in (B) (2) (% wt) | 20 | 21 | 22 | 21.5 | 21 | 21 | 21 |
| Sol. Xyl. in (B) (2) (% wt) | 37 | 35 | 39 | 37 | 40 | 37 | 35 |
| I.V. Sol. Xyl. (B) (2) (dl/g) | 4.2* | 1.8* | 1.5* | 2.1* | 1.6* | 1.1* | 1.00* |

*Calculated

TABLE 2

|  | Ex. 1 | Ex. 2 | Ex. 3 | Ex. 4 | Ex. 5 | Ex. 6 | Ex. 7 |
|---|---|---|---|---|---|---|---|
| MFR "L" (g/10 min) | 0.23 | 0.26 | 0.42 | 0.33 | 0.32 | 0.6 | 0.4 |
| Sol. Xyl. (% wt) | 48.1 | 50.0 | 56.4 | 51.1 | 51.0 | 47.4 | 49.5 |
| Ethylene content (% wt.) | 43.1 | 39.1 | 43.2 | 45.4 | 41.0 | 46.0 | 47.0 |
| 1-Butene content (% wt.) | 7.8 | 7.4 | 9.2 | 8.7 | 8.5 | 10.0 | 9.9 |
| I.V. Sol. Xyl. (dl/g) | 4.16 | 3.67 | 3.31 | 3.76 | 3.34 | 3.06 | 3.18 |
| Felxural Modulus (MPa) | 84 | 93 | 52 | 59 | 68 | 60 | 59 |
| Tensile Modulus (MPa) | 75 | 63 | 51 | 63 | 81 | 74 | 60 |
| Tensile Strength at Break (1) (MPa) | 26.6 | 34.5 | 29.8 | 34.0 | 37.0 | 31.8 | 29.9 |
| Elongation at Break (1) (%) | 795 | 880 | 746 | 731 | 841 | 831 | 819 |
| Hardness Shore D (°S) | 35.8 | 35.0 | 30.2 | 32.4 | 33.4 | 31.0 | 31.6 |
| Longitudinal CLTE (° C.$^{-1}$ × 10$^{-5}$) | 12.5 | 14.3 | 9.8 | 10.6 | 7.6 | 7.2 | 8.1 |

Comparative Examples 1 and 2

Polyolefin compositions comprising a crystalline propylene/ethylene copolymer (A) and a propylene/ethylene elastomeric copolymer (B) were tested for comparison purposes, according to the procedures reported above. The characteristics of these compositions, obtained as reactor grades, are shown in Table 3.

TABLE 3

|  | Comp. Ex. 1 | Comp. Ex. 2 |
|---|---|---|
| Propylene/ethylene cop. (A) (% wt) | 31 | 33 |
| Ethylene in (A) (% wt) | 3.2 | 3.8 |
| Sol. Xyl. (A) (% wt) | 6.0 | 5.5 |
| Propylene/ethylene cop. (B) (% wt) | 69 | 67 |
| Ethylene in B (% wt) | 27 | 28 |
| Ethylene content (% wt.) | 19.6 | 20.0 |
| Sol. Xyl. Tot. (% wt) | 64.0 | 62.5 |
| I.V. Sol. Xyl. (dl/g) | 3.2 | 3.2 |
| MFR "L" (g/10 min) | 0.6 | 0.45 |
| Flexural Modulus (MPa) | 80 | 89 |
| Tensile modulus (MPa) | 52 | 55 |
| Tensile Strength at Break (1) (MPa) | 23.9 | 24.0 |
| Elongation at Break (%) (1) | 740 | 700 |
| Hardness Shore D (°S) | 32.6 | 33.0 |

The above results demonstrate that the compositions of the present invention show very good values of flexibility, associated to an increases tenacity (tensile strength at break and elongation at break).

Roofing Application Tests

The following characterizations, specific for roofing applications, were carried out on the compositions obtained in the above-reported examples.

Sample Preparation and Characterization

On a single screw 1.25" Killion single screw extruder, with a barrel temperature set at 230° C., the tested polymer composition was stabilized for melt processing using phosphite (Irgafos 168), sterically hindered phenol (Irganox 1010), and calcium stearate as acid scavenger. The compounded composition was then extruded into 1 mm×200 mm wide sheet on an 1.5" single screw Killion Sheet extruder. Sheet samples were die cut into ASTM D 638 Type IV tensile specimens. Tensile properties were measured using an Instron tensile tester with a crosshead speed of 500 mm/min.

The results of the above measurements are reported in the following Table 4:

TABLE 4

| Property | Ex. 1 | Ex. 2 | Ex. 3 | Ex. 4 | Ex. 5 | Ex. 6 | Ex. 7 | Comp. Ex. 2 |
|---|---|---|---|---|---|---|---|---|
| Test temperature 23° C. | | | | | | | | |
| Tensile Strength at Break (2) (MPa) | 26.8 | 24.3 | 20.6 | 24.3 | 25.1 | 21.7 | 22.3 | 18.3 |
| Elongation at Breaked (2) (%) | 1480 | 1495 | 1485 | 1500 | 1585 | 1500 | 1520 | 1445 |
| Elongation at Yield (2) (%) | 24 | 25 | 25 | 28 | 26 | 24 | 26 | 22 |
| Toughness (MPa) | 198 | 191 | 158 | 182 | 201 | 168 | 174 | 144 |
| Tear Resistance (N/mm) | 72 | 70 | 63 | 68 | 70 | 67 | 63 | 63 |
| 2% Secant Modulus (MPa) | 71 | 77 | 58 | 65 | 71 | 66 | 61 | 78 |
| Test temperature −40° C. | | | | | | | | |
| Tensile Strength at Break (2) (MPa) | 33 | 27 | 23 | 27 | 24 | 25 | 24 | 24 |
| Elongation at Break (2) (%) | 678 | 573 | 541 | 550 | 593 | 599 | 614 | 271 |
| Toughness (MPa) | 149 | 128 | 102 | 121 | 121 | 117 | 122 | 47 |
| 2% Secant Modulus (MPa) | 540 | 462 | 442 | 425 | 456 | 372 | 513 | 464 |

The above results demonstrate an improvement in flexibility of the compositions of the invention, with a corresponding increase in tensile strength, toughness and tear with respect to the polyolefin compositions known in the state of the art.

Hot Air Weldability Testing

Hot air weldability is a specific test for single-ply roofing applications. Welds were formed by overlapping 25.4 mm wide areas of the neat sheet. Hot air was blown at the interface of the two sheets at a controlled temperature. The velocity or heating time was controlled, as well as the joining pressure at the interface. The test was carried out on 1 mm extruded sheets, using a Leister X84 precision hot air welder. The welding temperatures tested were 275° C., 345° C. and 415° C., at a welder speed of 1.3 m/min, to provide a welding window assessment.

Peel testing was performed on the hot air welds at 23° C. using 25 mm die cut strips, measuring peel force and elongation at failure. Failure mode was assessed by visual examination of the failed specimen. Table 5 provides the results of the above tests.

TABLE 5

| Property | Ex. 1 | Ex. 3 |
|---|---|---|
| Hot Air Temp 275° C. | | |
| Peel Force (N) | 173 | 78 |
| Elongation (%) | 749 | 1203 |
| Mode of Failure | Sheet Break | Sheet Break |
| Hot Air Temp 345° C. | | |
| Peel Force (N) | 151 | 182 |
| Elongation (%) | 980 | 1655 |
| Mode of Failure | Sheet Break | Sheet Break |
| Hot Air Temp 415° C. | | |
| Peel Force (N) | 187 | 73 |
| Elongation (%) | 877 | 1106 |
| Mode of Failure | Sheet Break | Sheet Break |

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

What is claimed is:

1. A polyolefin composition comprising:
(A) from about 15 to about 40% by weight of a crystalline copolymer of propylene with at least one alpha-olefin of formula $H_2C=CHR^1$, where $R^1$ is H or a $C_{2-8}$ linear or branched alkyl, containing at least about 90% by weight of propylene, having solubility in xylene at room temperature lower than about 15% by weight;
(B) from about 60 to about 85% by weight of an elastomeric fraction comprising:
(1) a copolymer of propylene with ethylene, optionally containing about 0.5 to 5% by weight of a diene, containing from about 20 to about 35% by weight ethylene and having solubility in xylene at room temperature greater than about 70% by weight, the intrinsic viscosity of the xylene soluble fraction being higher than about 3.0 dl/g up to about 6.0 dl/g; and
(2) a copolymer of ethylene with at least one alpha-olefin of formula $H_2C=CHR^2$, where $R^2$ is a $C_{2-8}$ linear or branched alkyl, optionally containing about 0.5 to 5% by weight of a diene, containing about 15% to 40% by weight alpha-olefin, and having solubility in xylene at room temperature greater than about 25% by weight, the intrinsic viscosity of the xylene soluble fraction ranging from about 0.5 to about 5.0 dl/g;

the (1)/(2) weight ratio ranging from about 1:5 to about 5:1.

2. The polyolefin composition according to claim 1, wherein the amount of the crystalline copolymer (A) ranges from about 15 to about 35% by weight.

3. The polyolefin composition according to claim 1, wherein the crystalline copolymer (A) contains at least about 95% by weight of propylene and has solubility in xylene at room temperature lower than about 10% by weight.

4. The polyolefin composition according to claim 1 wherein, in the crystalline copolymer (A), said alpha-olefin is ethylene.

5. The polyolefin composition according to claim 1, wherein the copolymer (1) of fraction (B) contains from about 25 to about 30% by weight ethylene and has solubility in xylene at room temperature greater than about 75% by weight, the intrinsic viscosity of the xylene soluble fraction ranging from about 3.5 to about 5.0 dl/g.

6. The polyolefin composition according to claim 1, wherein the copolymer (2) of fraction (B) contains from about 20 to about 35% by weight alpha-olefin and has solubility in xylene at room temperature greater than about 30% by weight, the intrinsic viscosity of the xylene soluble fraction ranging from about 1.0 to about 4.5 dl/g.

7. The polyolefin composition according to claim 1 wherein, in the copolymer (2) of fraction (B), said alpha-olefin is 1-butene, 1-hexene or 1-octene.

8. The polyolefin composition according to claim 1, having tensile strength at break ≧25 MPa (ASTM D 882, on a 100 μm film), elongation at break ≧700 MPa (ASTM D 882, on a 100 μm film), and toughness ≧150 MPa (ASTM D 638, on a 1 mm sheet).

9. The polyolefin composition according to claim 8, having tensile strength at break ≧28 MPa (ASTM D 882, on a 100 μm film), elongation at break ≧750 MPa (ASTM D 882, on a 100 μm film), and toughness ≧170 MPa (ASTM D 638, on a 1 mm sheet).

10. The polyolefin composition according to claim 1, wherein the composition is obtainable by sequential polymerization in at least three stages, carried out in the presence of a catalyst comprising a trialkylaluminum compound, optionally an electron donor, and a solid catalyst component comprising a halide or halogen-alcoholate of Ti and an electron-donor compound supported on anhydrous magnesium chloride.

11. A process for the preparation of a polyolefin composition as claimed in claim 1, comprising at least three sequential polymerization stages with each subsequent polymerization being conducted in the presence of the polymeric material formed in the immediately preceding polymerization reaction, wherein the crystalline copolymer (A) is prepared in at least one first stage, and the elastomeric polymer fraction (B) is prepared in at least two sequential stages, all polymerization stages being carried out in the presence of a catalyst comprising a trialkylaluminum compound, optionally an electron donor, and a solid catalyst component comprising a halide or halogen-alcoholate of Ti and an electron-donor compound supported on anhydrous magnesium chloride, said solid catalyst component having a surface area (measured by BET) of less than about 200 m²/g, and a porosity (measured by BET) greater than about 0.2 ml/g.

12. The process according to claim 11, wherein the sequential polymerization stages are all carried out in gas phase.

13. Sheets comprising the polyolefin composition of claim 1.

14. Single ply roofing sheet comprising the polyolefin composition of claim 1.

* * * * *